Sheet 2, 2 Sheets.
Milsom, Spendelow & Watson.
Ship's Ballast.
N° 47,030. Patented Mar. 28, 1865.
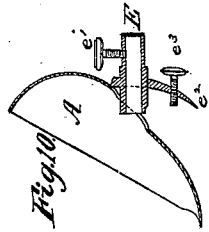
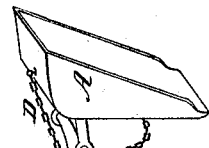
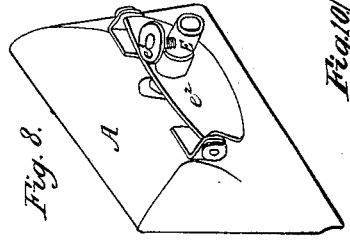
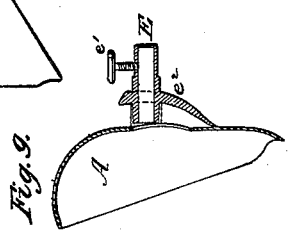
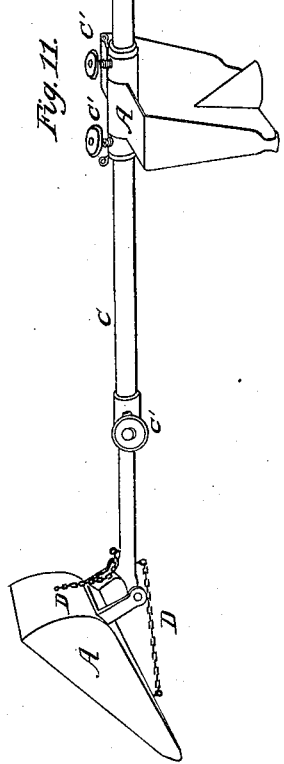
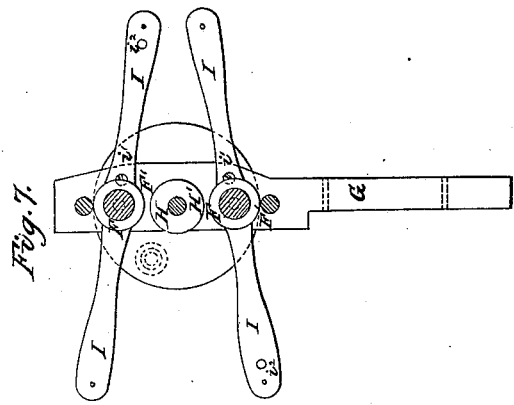
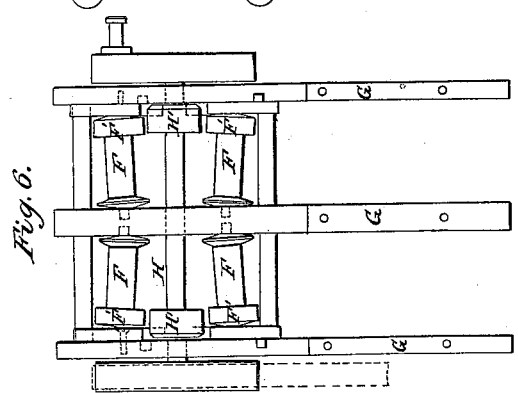
Witnesses.
W. H. Forbush.
B. H. Muehle.
Inventors.
George Milsom.
Henry Spendelow.
George V. Watson.

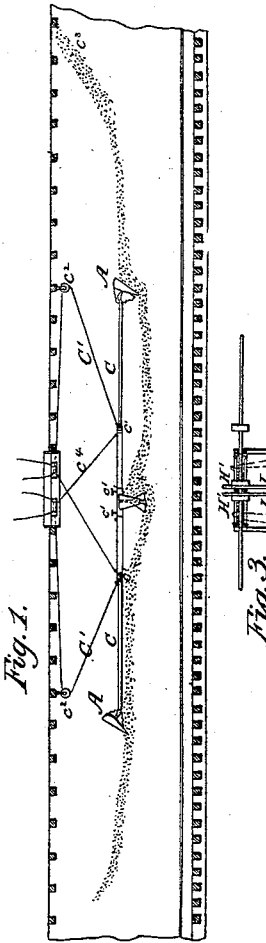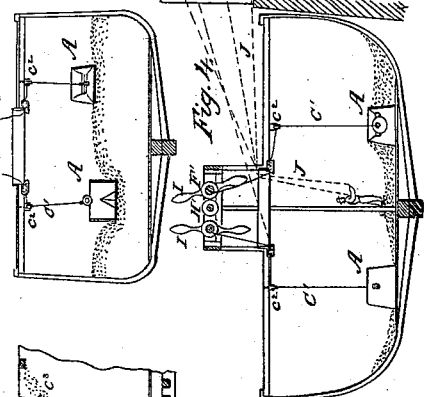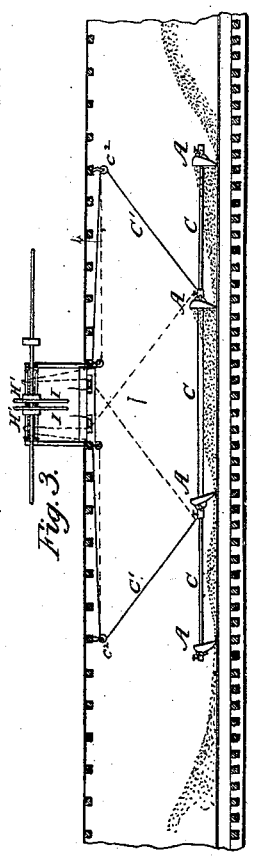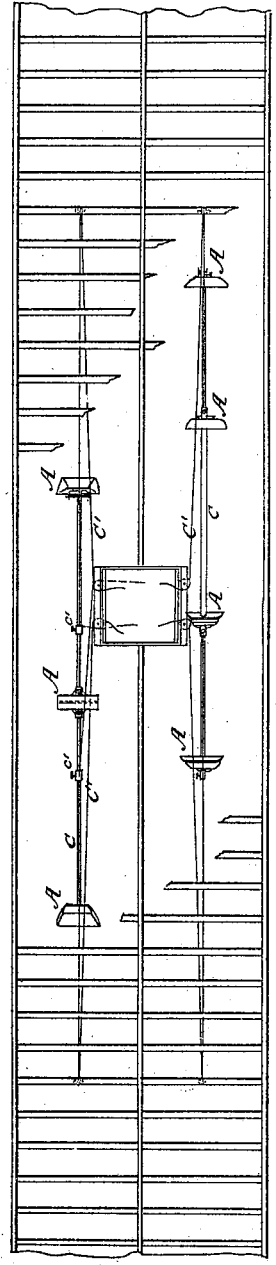

UNITED STATES PATENT OFFICE.

GEORGE MILSOM, HENRY SPENDELOW, AND G. V. WATSON, OF BUFFALO, NEW YORK.

IMPROVED APPARATUS FOR LEVELING GRAIN IN A VESSEL'S HOLD.

Specification forming part of Letters Patent No. 47,030, dated March 28, 1865.

*To all whom it may concern:*

Be it known that we, GEORGE MILSOM, HENRY SPENDELOW, and GEORGE V. WATSON, of the city of Buffalo, county of Erie, and State of New York, have invented certain new and useful Improvements in Apparatus for Trimming Cargoes into or Unloading Cargoes from Grain Vessels; and we do hereby declare that the following is a full, clear, and exact description of the construction and operation thereof, reference being had to the accompanying drawings, making a part of this specification, in which—

Figure I is a longitudinal section of a vessel with our improved apparatus therein, showing its construction, arrangement, and mode of operating as applied to trimming or distributing the grain in a vessel. Fig. II is a transverse section of same. Fig. III is a longitudinal section of a vessel, showing the arrangement and mode of operating the apparatus as applied to unloading the vessel or bringing the grain to elevator-leg. Fig. IV is a transverse section of same; Figs. III and IV also show an arrangement of windlass-barrels which may be applied as a fixture to steam-propellers or grain-vessels for working the apparatus by the application of the motive power of the vessel; Fig. IV also shows an arrangement of windlass-barrels located on the dock or in the elevator building. Fig. V is a plan of a section of a vessel, showing the trimming apparatus upon one side and the unloading apparatus upon the other. Fig. VI is a front elevation of an arrangement of windlass-barrels for operating the ropes or chains by which motion is given to the scoops or shovels, to be located on the dock or in the elevator building. Fig. VII is a vertical section of same. Fig. VIII represents a reversible scoop or shovel adapted to either trimming or unloading. Fig. IX shows its position when loaded and moving forward, and Fig. X its position when unloaded and moving backward. Fig. XI is a perspective of the scoops or shovels combined with an extension-rod as arranged and constructed for trimming.

The nature of this invention consists, first, in an apparatus for shoveling grain in vessels, so connecting a number of scoops or shovels together by an inflexible extension rod or rods as that their distance apart may be increased or diminished to meet the varying condition of the grain to be moved; second, connecting the ropes or chains by which motion is given to the scoops or shovels to the connecting rod or rods at points between the end scoops or shovels, so as to allow the said end scoops to be projected in their movement beyond the sheave or block over which the leading rope or chain runs, thus allowing the vessel to be loaded without covering up any part of the shoveling apparatus; third, in the construction of a reversible scoop or shovel adapted to either trimming or unloading; fourth, in the construction of a double-acting scoop or shovel for trimming grain into a vessel, capable of being worked in a very contracted space, so that its action will not be stopped by the filling of the vessel as soon as would that of two single scoops, which would otherwise be required; fifth, in arranging the windlass-barrels for operating the scoops over the hatch of a steam-vessel in such manner that they may be driven by the motive power of the vessel; sixth, in so arranging the windlass-barrels and changing-levers, either upon the dock or on the vessel, that their motion shall be entirely under the control of a person or persons stationed in the hold of the vessel and having full view of the moving scoops or shovels, whereby said person or persons may stop or start or give any required motion, long or short, to said scoops or shovels at pleasure.

Letters of like name and kind refer to like parts in each of the figures.

We will first describe the construction, arrangement, and mode of operating our improved apparatus as applied to the trimming or distributing of the grain in the vessel, special reference being had to Figs. I, II, V, and VIII to XI inclusive.

A represents the scoops or shovels by which the grain is distributed. There may be two, three, or more in number, being connected together by an inflexible extension-rod or stretcher, C, so constructed that their distance apart may be readily increased or diminished to meet the varying conditions of the grain. This inflexible rod or stretcher may be made in any convenient manner, but a tubular or telescopic device, as represented, is considered preferable, as it combines strength and lightness with ready adjustment.

Three scoops or shovels will be sufficient for vessels of ordinary size, but for large vessels more may be used, or a greater number having the same collective, but less individual, capacity may be used in either large or small vessels.

A horizontal reciprocating motion is given to the shovels by the action of the ropes or chains $C'$, leading over the movable sheaves or blocks $c^2$, connected to the deck-beams of the vessel, and out through the hatch of the vessel, through which the grain is being received into the vessel, to revolving windlass barrels or drums located either over the hatch on the dock or in the elevator building, the arrangement being similar to that described in the Letters Patent granted to us August 2, 1864.

The ropes $C'$ are fastened to the stretcher C at points equidistant from the center shovel and between the end shovels, so that in their reciprocating movement the end shovels may be projected beyond the leading-blocks $c^2$ and made to fill up the grain to the deck of the vessel, as shown at $c^3$, without covering up said blocks and rendering them inaccessible, when by such filling up of the vessel they require moving, which would evidently be the case were the ropes connected outside of the end scoops. The scoops may be made to travel to any required distances on either side of the receiving-hatch within the limits fixed by the position of the leading-blocks $c^2$, by the variable operation of the driving windlass-barrels, as hereinafter described, which said movement may be unequal when the receiving-hatch is nearer to one end of the vessel than the other.

As the vessel fills up with grain, the required movement of the scoops will decrease until the end scoops may be removed and the labor be performed by the center scoop alone. To enable it to do this, it requires to be made double-faced, as shown in Fig. XI, so that it will move the grain in its movement in either direction, by which construction its action may be continued until the vessel is entirely loaded, or nearly so.

The end scoops are hinged to the stretcher-rod C a little above their center, as shown in Fig. XI, and are provided with guard-chains, D, attached to the rod and to the scoop above and below its hinge, allowing them to assume the positions shown in Fig. XI, the right-hand scoop being loaded and moving forward, and the left-hand scoop unloaded and moving back.

The leading-blocks $c^2$ may be dispensed with and the ropes $C'$ led directly to the hatch, as shown by the red lines $c^4$; but in that case it is evident that the compressive strength and stiffness of the stretcher must be sufficient to push forward the loaded shovels, while by the first-described arrangement its tensile strength is employed to simply bring back the empty scoops. This is not true, however, of those parts of the stretcher which may project beyond the points of connection of the ropes $C'$, they evidently receiving a compressive strain.

We will now proceed to describe the arrangement of our apparatus as applied to unloading or bringing the grain to the elevator-leg entered through the hatch of the vessel and by which it is taken up into the elevator building or storehouse. The only essential change to be effected is the reversing of the scoops, so that they will bring grain to the hatch instead of taking it from the hatch. This arrangement is shown specially in Figs. III, IV, and V. The scoops or shovels A in these figures are of the construction shown in detail in Figs. VIII, IX, and X. Two, four, or more may be used, they being connected together by a stretcher, C, of the construction before described, so that their distance apart may be increased or diminished to conform to the distance they are required to bring the grain. They are given a reciprocating motion in the manner before described for the trimming apparatus. Being required to bring the grain to a given point each time—viz., the elevator-leg—it is evident that the reciprocating motion of the scoops must be equal in extent to their distance apart. The leading-blocks $c^2$ may be dispensed with to advantage in this arrangement and the ropes led directly to the hatch, since in this case the ropes will move the loaded scoop, and the stretcher be simply required to move back the unloaded scoop.

Figs. VIII, IX and X, represent a reversible scoop, which may be used either for trimming or unloading, it having a hole through it a little above its center, through which the stretcher-rod may pass, and being hinged to a sleeve, E, slipping over the stretcher-rod and provided with a set-screw, $e'$, by which it may be fixed thereon, thus rendering it capable of attachment to the stretcher-rod with its face in either direction in which it may be required to operate. The sleeve has a stop arm or plate, $e^2$, connected to it, which causes the scoop to assume a proper angle when loaded. This arm or plate may also be provided with a set-screw, $e^3$, by which said angle may be adjusted.

The foregoing description refers to simply one set of scoops, while in reality there are two like sets, one on each side of the vessel, so that the vessel is loaded or unloaded simultaneously and equally on its four quarters, thus preventing any straining of the vessel by an uneven or unequal removal or distribution of the load.

The apparatus for operating the ropes or chains by which the reciprocating motion is given to the scoops or shovels consists of four windlass-barrels, F, (see Figs. VI and VII,) supported in pairs by the posts G. They are driven from a shaft, H, located between them and receiving its motion from any convenient source. One end of each barrel is supported by a lever, I, having its fulcrum at $i'$, and carries a friction-wheel, F', in line with a friction-wheel, H', on the driving-shaft H. By the movement of the lever I the friction wheel F' of the windlass-barrel may be thrown in contact with the friction-wheel H' of the driving-shaft, so that motion will be given to the windlass-barrel as long as said contact is maintained. The weight of the windlass-barrels is counterbalanced by a weight attached to the lever I, as shown at $i^2$, so that the lever being released, the contact of the friction-wheels is immediately broken and the motion of the windlass-barrels stopped.

The ropes C' being connected one to each windlass-barrel, a reciprocating motion of any required length may be given to the scoops by one of the ropes being wound up on its windlass and the other allowed to unwind from its windlass, and vice versa, the action of the levers giving perfect control of the duration of the movement of either of the windlasses, and consequently of the movement of the shovels. These windlasses may be located either on the dock or in the elevator building, as shown at the right of Fig. IV, or in the case of a steam-vessel they may be made a fixture thereon and driven by the motive power of said vessel. In either case it is necessary that by an arrangement of cords or lines, J J, (see Fig. IV,) or other equivalent device, connected with the operating-levers I and leading into the hold of the vessel, the movement of the windlasses shall be brought within the perfect control of a person or persons stationed in the hold of the vessel and having full view of the movements of the scoops, so that he or they may control such movements perfectly.

Having thus described our invention, what we claim, and desire to secure by Letters Patent, is—

1. Connecting a number of scoops or shovels, A, together by an inflexible extensible rod or stretcher, C, for the purposes and substantially as described.

2. Connecting the ropes or chains C', by which motion is given to the scoops or shovels A, to the connecting-rod or stretcher C at points between the end scoops or shovels, substantially as and for the purposes set forth.

3. A reversible scoop or shovel, Fig. VIII, constructed and operating on the rod as and for the purposes set forth.

4. A double-acting scoop or shovel, Fig. XI, constructed and operating on the rod as and for the purposes set forth.

5. The combination of the windlass-barrels F and changing levers I, so located and connected that a person or persons stationed in the hold of the vessel where the grain is, and having full view of the moving scoops or shovels, shall also have control of the said windlass-barrels and shovels, to regulate and control the movements thereof, substantially as set forth.

GEORGE MILSOM.
HENRY SPENDELOW.
GEO. V. WATSON.

Witnesses:
GEO. W. WALLACE,
W. H. FORBUSH.